United States Patent
Prigge et al.

(10) Patent No.: US 12,027,182 B2
(45) Date of Patent: Jul. 2, 2024

(54) AUTOMATIC IMPLEMENTATION OF A PHYSICAL BARRIER TO PROTECT REMOVABLE STORAGE MEDIA ACCESS

(71) Applicant: Quantum Corporation, San Jose, CA (US)

(72) Inventors: Carsten Prigge, Elizabeth, CO (US); Turguy Goker, Oceanside, CA (US); Robert Yang, Greenwood Village, CO (US); Bruno Hald, Parker, CO (US); Robert Munio, Superior, CO (US); Randall Elmer, Colorado Springs, CO (US); Ryan Duffy, Westminster, CO (US); Scott Rockwell, Aurora, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 18/181,275

(22) Filed: Mar. 9, 2023

(65) Prior Publication Data
US 2023/0215463 A1    Jul. 6, 2023

Related U.S. Application Data (63) Continuation of application No. 17/192,396, filed on Mar. 4, 2021, now Pat. No. 11,605,401.

(60) Provisional application No. 63/017,452, filed on Apr. 29, 2020.

(51) Int. Cl.
| | | |
|---|---|---|
| G11B 23/28 | (2006.01) |
| G11B 15/04 | (2006.01) |
| G11B 15/68 | (2006.01) |
| G11B 17/22 | (2006.01) |
| G11B 23/03 | (2006.01) |

(52) U.S. Cl.
CPC ............ *G11B 23/287* (2013.01); *G11B 15/04* (2013.01); *G11B 15/682* (2013.01); *G11B 15/689* (2013.01); *G11B 17/22* (2013.01); *G11B 23/0307* (2013.01); *G11B 23/288* (2013.01); *G11B 2220/90* (2013.01)

(58) Field of Classification Search
None
See application file for complete search history.

(56) References Cited

U.S. PATENT DOCUMENTS

| | | | | |
|---|---|---|---|---|
| 5,613,154 A | * | 3/1997 | Burke | G11B 15/6825 360/99.06 |
| 5,761,032 A | * | 6/1998 | Jones | G11B 33/128 |
| 5,820,055 A | * | 10/1998 | Leger | G11B 17/22 242/337 |
| 5,867,458 A | * | 2/1999 | Barkley | G11B 15/6825 |
| 5,926,341 A | | 7/1999 | Mueller et al. | |

(Continued)

*Primary Examiner* — Peter Vincent Agustin
(74) *Attorney, Agent, or Firm* — James P. Broder; Anne-Marie Dinius (57) ABSTRACT

The technology disclosed herein enables automatic implementation of a physical barrier to protect access to data on removable storage media. In a particular embodiment, a method provides determining that the item moved into a storage position using an automatic transfer mechanism and determining that a condition for protecting the item is satisfied. Upon determining that the condition is satisfied, the method provides implementing a physical barrier that prevents the automatic transfer mechanism from removing the item from the storage position.

20 Claims, 8 Drawing Sheets

(56) References Cited

U.S. PATENT DOCUMENTS

| | | | |
|---|---|---|---|
| 6,011,669 A * | 1/2000 | Apple | G11B 15/6825 |
| 6,198,594 B1 | 3/2001 | Utsumi et al. | |
| 6,550,391 B1 * | 4/2003 | Ostwald | G11B 15/6805 |
| 6,690,994 B1 * | 2/2004 | Smith | G11B 15/6835 |
| | | | 700/214 |
| 6,834,215 B1 * | 12/2004 | Ostwald | G11B 17/228 |
| | | | 700/214 |
| 7,076,327 B1 * | 7/2006 | Desai | H04N 21/2405 |
| | | | 700/214 |
| 8,929,023 B1 | 1/2015 | Jesionowski et al. | |
| 9,336,815 B1 | 5/2016 | Trachy et al. | |
| 9,396,754 B1 | 7/2016 | Wong | |
| 9,888,615 B1 | 2/2018 | Frink et al. | |
| 10,424,331 B1 | 9/2019 | Hippargi et al. | |
| 11,475,919 B1 * | 10/2022 | Nave | G11B 23/0301 |
| 11,605,401 B2 * | 3/2023 | Prigge | G11B 15/689 |
| 2004/0118215 A1 | 6/2004 | Reasoner et al. | |
| 2005/0195520 A1 | 9/2005 | Starr et al. | |
| 2006/0215302 A1 * | 9/2006 | Murakami | G11B 15/6835 |
| 2007/0008640 A1 * | 1/2007 | Sasaki | G11B 15/689 |
| 2010/0265606 A1 | 10/2010 | Thompson et al. | |
| 2011/0167589 A1 * | 7/2011 | Hartl | E05C 19/06 |
| | | | 16/85 |
| 2012/0286633 A1 | 11/2012 | Hashimoto | |
| 2013/0128384 A1 | 5/2013 | Tolliver | |
| 2018/0268874 A1 | 9/2018 | Miranda Gavillan | G11B 33/1406 |
| 2019/0088281 A1 * | 3/2019 | Dolbear | G11B 15/6835 |
| 2021/0343313 A1 * | 11/2021 | Prigge | G11B 23/287 |
| 2023/0215463 A1 * | 7/2023 | Prigge | G11B 15/682 |
| | | | 360/60 |

\* cited by examiner

AUTOMATIC IMPLEMENTATION OF A PHYSICAL BARRIER TO PROTECT REMOVABLE STORAGE MEDIA ACCESS

RELATED APPLICATIONS

This application is a Continuation Application and claims the benefit under 35 U.S.C. 120 on co-pending U.S. patent application Ser. No. 17/192,396, filed on Mar. 4, 2021, and entitled "AUTOMATIC IMPLEMENTATION OF A PHYSICAL BARRIER TO PROTECT REMOVABLE STORAGE MEDIA ACCESS". Additionally, U.S. patent application Ser. No. 17/192,396 is related to and claims priority to U.S. Provisional Patent Application 63/017,452, titled "Methods for Automated Means to Mechanically Prevent Access to Data on Media to Protect from Malware Intrusion," filed Apr. 29, 2020. As far as permitted, the contents of U.S. patent application Ser. No. 17/192,396 and U.S. Provisional Application Ser. No. 63/017,452 are incorporated in their entirety herein by reference.

TECHNICAL BACKGROUND

Many methods and procedures currently exist to protect data from unauthorized access. For instance, data may be encrypted and/or password protected to ensure that only authorized users are able to read the data. Items of removable storage media, such as magnetic tape cartridges, can take things one step further by physically moving the items from a device used to access the data stored thereon. In an automated removable storage media system, such as a robotic tape library, even the physical separation, sometimes referred to as an "air gap", created when storing an item of media apart from an access device may be circumvented. In such automated storage systems, the software, firmware, or other computing instructions that are executing on the computing systems that control data access (e.g., the host system) and media item movement (e.g., a robotic arm controller) may be compromised. Those compromised computing systems may then be directed to insert an item of removable storage media into an access device, thereby removing the air gap that had been preventing access to the data on the item. Some systems may address the above issues by having instructions hardcoded into their operating instructions (e.g., firmware) that prevents removal of items placed in certain storage positions. Although, it may still be possible to replace those hardcoded instructions to allow for removal of the items.

SUMMARY

The technology disclosed herein enables automatic implementation of a physical barrier to protect access to data on removable storage media. In a particular embodiment, a method provides determining that the item moved into a storage position using an automatic transfer mechanism and determining that a condition for protecting the item is satisfied. Upon determining that the condition is satisfied, the method provides implementing a physical barrier that prevents the automatic transfer mechanism from removing the item from the storage position.

In some embodiments, implementing the physical barrier includes moving the storage position to a location beyond reach of the automatic transfer mechanism. In those embodiments, the location may still allow the automatic transfer mechanism to recognize that the item is at the storage position.

In some embodiments, implementing the physical barrier includes positioning a catch for the item at the storage position.

In some embodiments, after implementing the physical barrier, only movement triggered by a human user collocated with the physical barrier can remove the physical barrier.

In some embodiments, the storage position is one of a plurality of storage positions and wherein the physical barrier prevents the automatic transfer mechanism from removing all items of removable storage media positioned in the plurality of storage positions.

In some embodiments, the item includes a write-protection actuator that, when engaged, indicates to an access device for that item that the item is write-protected. In those embodiments, the method further includes, before implementing the physical barrier, engaging the write-protection actuator using the automatic transfer mechanism. In those embodiments, the automatic transfer mechanism may be physically incapable of disengaging the write-protection actuator and engaging the write-protection actuator may occur in response to determining that a second criterion is satisfied.

In some embodiments, the item comprises a magnetic tape cartridge and wherein a robotic tape library includes an access device, the automatic transfer mechanism, and the storage position.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to determine that the item moved into a storage position using an automatic transfer mechanism and determine that a condition for protecting the item is satisfied. Upon determining that the condition is satisfied, the program instructions direct the processing system to implement a physical barrier that prevents the automatic transfer mechanism from removing the item from the storage position.

DETAILED DESCRIPTION

The barrier control systems described herein implement a physical barrier between items of removable storage media and an automatic transfer mechanism (e.g., robotic arm) used to move the items. The physical barrier may be any physical limitation that prevents the mechanism from moving an item protected by the physical barrier. Consequently, when the physical barrier is in place, even if a system controlling the transfer mechanism is compromised, the transfer mechanism will be physically prevented from completing any move action on a storage item protected by the physical barrier. Additionally, since the physical barrier is implemented automatically upon satisfaction of one or more conditions, the physical barrier is not subject to human error (or other delay, which could leave media items vulnerable (i.e., without the physical barrier) for longer than necessary in situations where a user is tasked with manually creating the barrier (e.g., tasked with physically removing the media items from the system). Once implemented, the physical barrier preferably cannot be removed at the direction of any system involved in moving the item to an access device or accessing the data on the item, such as a host computing system or a transfer mechanism controller. As such, even if those systems were compromised, it would be impossible for the systems to remove the physical barrier. In fact, the physical barrier, in some examples, may require physical interaction from a human user at the physical barrier to be removed, which ensures no remote system can remove the physical barrier.

Figure 1:
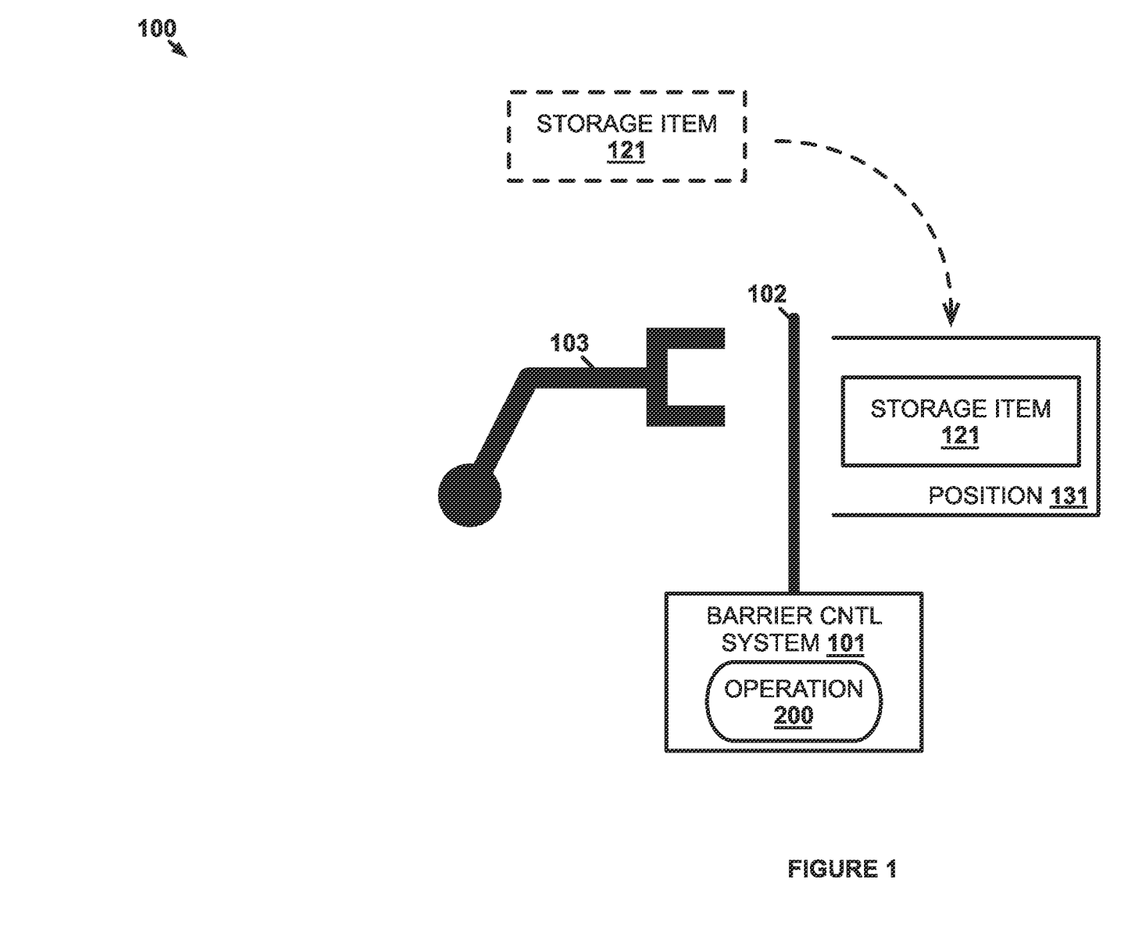
FIG. 1 illustrates an implementation for automatically implementing a physical barrier to prevent removable storage media access.

FIG. 1 illustrates implementation 100 for automatically implementing a physical barrier to prevent removable storage media access. Implementation 100 includes barrier control system 101, physical barrier 102, automatic transfer mechanism 103, storage item 121, and storage position 131. Implementation 100 may be part of an automated storage library that automatically moves items of removable storage media, including storage item 121, between access positions (e.g., positions having an access device for accessing the items) and storage positions where the items are stored when not being accessed.

Storage item 121 is an item of removable storage media, such as a magnetic tape, optical disk, magnetic disk, flash memory, or some other type of removable memory. In general, removable storage media comprises any type of computer readable medium that is designed to be readily removed from a system or device configured to access data thereon. For example, magnetic tape cartridges are designed for access by a computing system when inserted into a magnetic tape drive but can be removed for portability or to free up the drive for access to other magnetic tape cartridges. In some cases, a media type may be considered removable depending on the type of enclosure used. For instance, a hard disk drive may be placed in an enclosure allowing for easy insertion and removal from a system rather than being more permanently installed. In no examples is storage item 121 a mere propagated signal.

Though shown as an arm, automatic transfer mechanism 103 may be any combination of components capable of moving storage item 121 into and out of storage position 131. Automatic transfer mechanism 103 may include motors, belts, gears, or some other type of moving component. In some cases, automatic transfer mechanism 103 may include processing circuitry for controlling the moving components. Though not shown, a separate control system may be employed to direct the movements of automatic transfer mechanism 103. For example, the control system may receive a request from a host computer to access data on storage item 121 and may, responsively, control automatic transfer mechanism 103 to move storage item 121 into an access device (not shown).

Storage position 131 is any physical location wherein storage item 121 can be placed by automatic transfer mechanism 103. Preferably, storage position 131 is only capable of holding one storage item at a time. In some examples, storage position 131 may be sized and shaped to surround storage item 121 but for at least an opening (facing automatic transfer mechanism 103 in implementation 100) through which storage item 121 can be placed into storage position 131. In some examples, storage position 131 may be one of multiple storage positions into which automatic transfer mechanism 103 can place storage items (e.g., may be a storage position in a magazine of storage positions). In some examples, storage position 131 may include mechanisms that prevent storage item 121 from inadvertently sliding out of storage position 131 unless automatic transfer mechanism 103 is removing storage item 121. For instance, rubber inserts within storage position 131 may squeeze or otherwise cause friction on storage item 121 to keep storage item 121 from moving unless appropriate force, such as that from automatic transfer mechanism 103, is applied.

In this example, automatic transfer mechanism 103 moves storage item 121 into storage position 131, which is a physical location where an item of removable storage media can be stored when not being accessed. When physical barrier 102 is not implemented, automatic transfer mechanism 103 is capable of moving storage item 121 from storage position 131 (e.g., is able to grasp storage item 121 and remove storage item 121 from storage position 131 to another position, such as to an access device or ingress/egress position). However, once physical barrier 102 is implemented by barrier control system 101 performing operation 200, as described below, physical barrier 102 prevents automatic transfer mechanism 103 from moving storage item 121 from storage position 131. Barrier control system 101 is a computing system comprising processing circuitry to determine when physical barrier 102 should be implemented. Barrier control system 101 also includes one or more mechanism(s), such as a solenoid, motor, spring, catch, hinge, or other component for creating/placing a physical barrier, to implement physical barrier 102 at the direction of the processing circuitry. While shown as a bar between automatic transfer mechanism 103 and storage item 121, physical barrier 102 may be a component, such as a door or a catch, that physically blocks automatic transfer mechanism 103 from contacting, or grasping, storage item 121 or prevents storage item 121 from being removed from storage position 131 even if automatic transfer mechanism 103 is still able to grasp storage item 121. In some examples, physical barrier 102 may be a gap between storage item 121 in storage position 131 and automatic transfer mechanism 103 that is larger than automatic transfer mechanism 103 is capable of reaching, which prevents automatic transfer mechanism 103 from grasping storage item 121.

Figure 2:
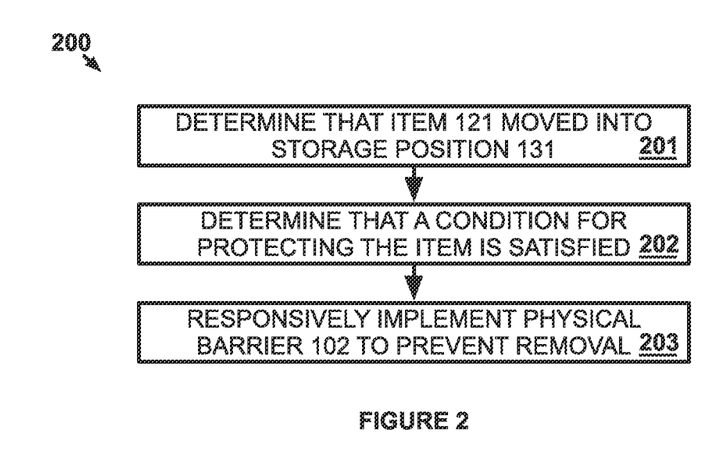
FIG. 2 illustrates an operation to automatically implement a physical barrier to prevent removable storage media access.

FIG. 2 illustrates operation 200 to automatically implement a physical barrier to prevent removable storage media access. In operation 200, barrier control system 101 determines that storage item 121 moved into storage position 131 using automatic transfer mechanism 103 (201). In this example, storage item 121 is moved into storage position 131 by automatic transfer mechanism 103, although, storage item 121 may be moved into storage position 131 by other means, such as placement by a human, in other examples. Barrier control system 101 may use one or more sensors, such as a proximity sensor at storage position 131 or a camera with image analysis, to determine that storage item 121 now occupies storage position 131 or may be notified of storage item 121's presence in storage position 131 by another system (e.g., a host system or a control system for automatic transfer mechanism 103) or a user. In some examples, barrier control system 101 may determine that storage item 121, specifically, is located in storage position 131 while, in other examples, barrier control system 101 may simply determine that a storage item, generally, is located in storage position 131.

Barrier control system 101 also determines that a condition for protecting storage item 121 is satisfied (202). In some examples, the condition may require that a storage item be located in storage position 131 (i.e., occupying storage position 131) and is, therefore, satisfied by storage item 121 being located in storage position 131. In other examples, the condition may require that storage item 121, specifically, is located in storage position 131 for satisfaction. In that case, determining that storage item 121 is located in storage position 131 would satisfy the condition. In some examples, the condition may be one of multiple conditions that also need to be satisfied to trigger implementation of physical barrier 102. Thus, barrier control system 101 may determine that those one or more other conditions are also satisfied. To be satisfied, a condition may require that a predefined number (e.g., all or a percentage) of storage positions subject to physical barrier 102, including storage position 131, are occupied, may require that the storage item in storage position 131 has reached its data capacity, may require an indication that data stored on storage item 121 has met a protection threshold (e.g., the data has a security/sensitivity level satisfying the threshold for extra protection by physical barrier 102), may require receipt of a control signal/message from another system (e.g., a host system that controls access to data on storage item 121) regardless of what caused the transfer of the control signal/message, or may require some other criterion be met. Satisfaction of a condition may be determined by barrier control system 101 by itself or in conjunction with other systems. For example, barrier control system 101 may use its own sensor(s) at storage position 131 to determine that storage item 121 has been placed in storage position 131, which would thereby indicate satisfaction of a condition that storage position 131 be occupied. In other examples, barrier control system 101 may receive information from one or more other systems/devices to determine that a condition is satisfied. For instance, after writing data to storage item 121, a host system may notify barrier control system 101 that the data is highly sensitive, which may satisfy a protection threshold condition at barrier control system 101.

The above condition-satisfaction determination may be performed in response to determining that storage item 121 has been placed in storage position 131 or may be performed some other time after storage item 121 has been placed in storage position 131. For example, the condition (or conditions in some examples) may not be satisfied on an initial attempt to determine whether the condition is satisfied. Determining that the condition has been satisfied in the step described above may, therefore, occur on a subsequent attempt after that initial attempt. The subsequent attempt may be one of multiple subsequent attempts made by barrier control system 101 to determine whether the condition is satisfied. For instance, after storage item 121 has been placed in storage position 131, barrier control system 101 may periodically, or on some other scheduled, determine whether condition(s) for implementing physical barrier 102 are satisfied.

Upon determining that the condition is satisfied, barrier control system 101 implements physical barrier 102 that prevents automatic transfer mechanism 103 from removing storage item 121 from storage position 131 (203). In some examples, implementing physical barrier 102 may also require a determination that one or more other conditions are also satisfied, as mentioned above. For instance, one condition may require that storage item 121 be placed in storage position 131 and another may require that storage item 121 be at capacity. The actions taken by barrier control system 101 to implement physical barrier 102 may depend upon the type of barrier that physical barrier 102 is (e.g., door, latch, physical air gap, or some other type of physical obstruction between physical barrier 102 and automatic transfer mechanism 103) and the mechanisms used to position physical barrier 102. The mechanisms may include motors, actuators, solenoids, springs, belts, latches, or other type of mechanical component. For example, barrier control system 101 may control a motor to move physical barrier 102 into position while, in another example, a spring may be loaded such that barrier control system 101 controls the movement of a catch (e.g., moves it from a position holding physical barrier 102 in a ready position) that enables the spring to pull physical barrier 102 into position. In other examples, physical barrier 102 may be implemented by moving storage position 131 (e.g., via a motor, spring, or otherwise) out of reach of automatic transfer mechanism 103 or otherwise into a position/orientation that prevents automatic transfer mechanism 103 from being able to remove storage item 121 from storage position 131.

After physical barrier 102 is implemented, automatic transfer mechanism 103 is unable to remove storage item 121 from storage position 131. As such, even if a system controlling automatic transfer mechanism 103 was compromised and instructed automatic transfer mechanism 103 to remove storage item 121 from automatic transfer mechanism 103, automatic transfer mechanism 103 would be physically incapable of complying with the instruction due to physical barrier 102. In some examples, automatic transfer mechanism 103 may include sensors for detecting that a storage item is in a storage position. In those examples, physical barrier 102 may be implemented such that automatic transfer mechanism 103 can still detect that storage item 121 is in storage position 131 (e.g., can still scan an identifying barcode on storage item 121). Although, automatic transfer mechanism 103 may return an error if instructed to move storage item 121 due to physical barrier 102 preventing automatic transfer mechanism 103 from complying with that the instructions.

Figure 3:
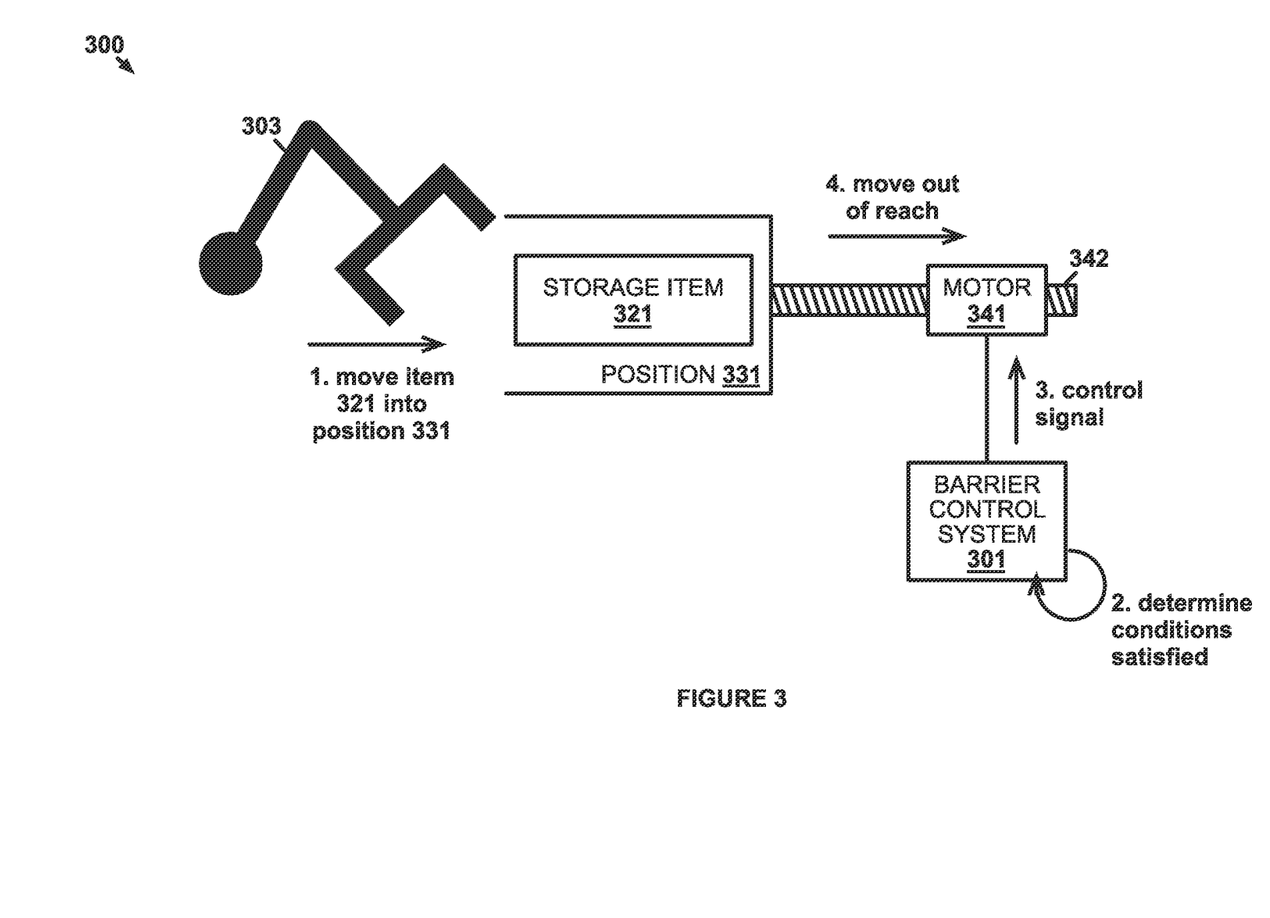
FIG. 3 illustrates an operational scenario for automatically implementing a physical barrier to prevent removable storage media access.

FIG. 3 illustrates operational scenario 300 for automatically implementing a physical barrier to prevent removable storage media access. Operational scenario 300 includes barrier control system 301, automatic transfer mechanism 303, storage item 321, storage position 331, screw motor 341, and screw 342. Barrier control system 301 is an example of barrier control system 101, automatic transfer mechanism 303 is an example of automatic transfer mechanism 103, storage item 321 is an example of storage item 121, and storage position 331 is an example of storage position 131. While shown separately, screw motor 341 and/or screw 342 may be considered part of barrier control system 301. There is no explicit example of physical barrier 102 in operational scenario 300 because the physical barrier created by barrier control system 301 in this scenario is an air gap between automatic transfer mechanism 303 and storage position 331.

In operational scenario 300, one end of screw 342 is affixed to storage position 331. As screw 342 rotates relative to threads in screw motor 341, storage position 331 moves closer to or away from automatic transfer mechanism 303 depending on the direction of rotation. While not shown, storage position 331 may move on a track or other type of guide. In this example, motor 341 is stationary and includes threads that rotate around screw 342, which causes screw motor 341 to move. Although, other types of screw drive arrangements may be used in other examples (e.g., screw motor 341 may rotate screw 342 through stationary threads affixed to storage position 331). Similarly, while operational scenario 300 uses a screw drive, other motor operated drive types may be used in other examples. For instance, storage position 331 may be affixed to a belt, chain, or rod that a motor moves to move storage position 331. Also, while storage position 331 is moved linearly in operational scenario 300, storage position 331 may be moved in different paths in other examples (e.g., storage position 331 may be affixed to a swing arm on a hinge and storage position 331, when moved, takes an arced path away from automatic transfer mechanism 303).

Operational scenario 300 begins with automatic transfer mechanism 303 moving storage item 321 at step 1 into storage position 331. After storage item 321 is moved into storage position 331, barrier control system 301 determines at step 2 that conditions for barrier implementation are satisfied. The conditions include one or more conditions that, upon satisfaction, trigger barrier control system 301 to implement a physical barrier between automatic transfer mechanism 303 and storage item 321. Upon satisfaction of the conditions, barrier control system 301 sends a control signal at step 3 to screw motor 341. The control signal directs screw motor 341 to move storage position 331 away from automatic transfer mechanism 303 via screw 342, which screw motor 341 does at step 4. Since storage item 321 is located in storage position 331, storage item 321 is moved away from automatic transfer mechanism 303 along with storage position 331. Upon completion of the move, storage item 321 is far enough away from automatic transfer mechanism 303 that automatic transfer mechanism 303 cannot grasp storage item 321 to remove storage item 321 from storage position 331.

In some examples, the control signal may be a supply of power (i.e., electricity) to screw motor 341 that causes screw motor 341 to turn in the appropriate direction necessary for screw 342 to move storage position 331 from automatic transfer mechanism 303. The power would be supplied at least for a duration necessary to move storage position 331 to a location where automatic transfer mechanism 303 cannot grasp storage item 321. In some examples, screw motor 341 may have its own power supply and processing/communication circuitry such that the control signal may be a instruction message transferred from barrier control system 301 over a wired and/or wireless link between screw motor 341 and barrier control system 301. Upon receipt of the instruction message, the processing circuitry of screw motor 341 directs screw motor 341 to comply with the instruction message, which moves storage position 331 away from automatic transfer mechanism 303.

Once storage position 331 is moved out of reach from automatic transfer mechanism 303, barrier control system 301 preferably cannot move storage position 331 back into a reachable position at the instruction of a system that could possibly be compromised, such as an internet connected computing system. For example, barrier control system 301, or screw motor 341, may include a physical button, or other type of user interface, that must be physically actuated by a human user to trigger screw motor 341 moving storage position 331 back into reach of automatic transfer mechanism 303.

Figure 4:
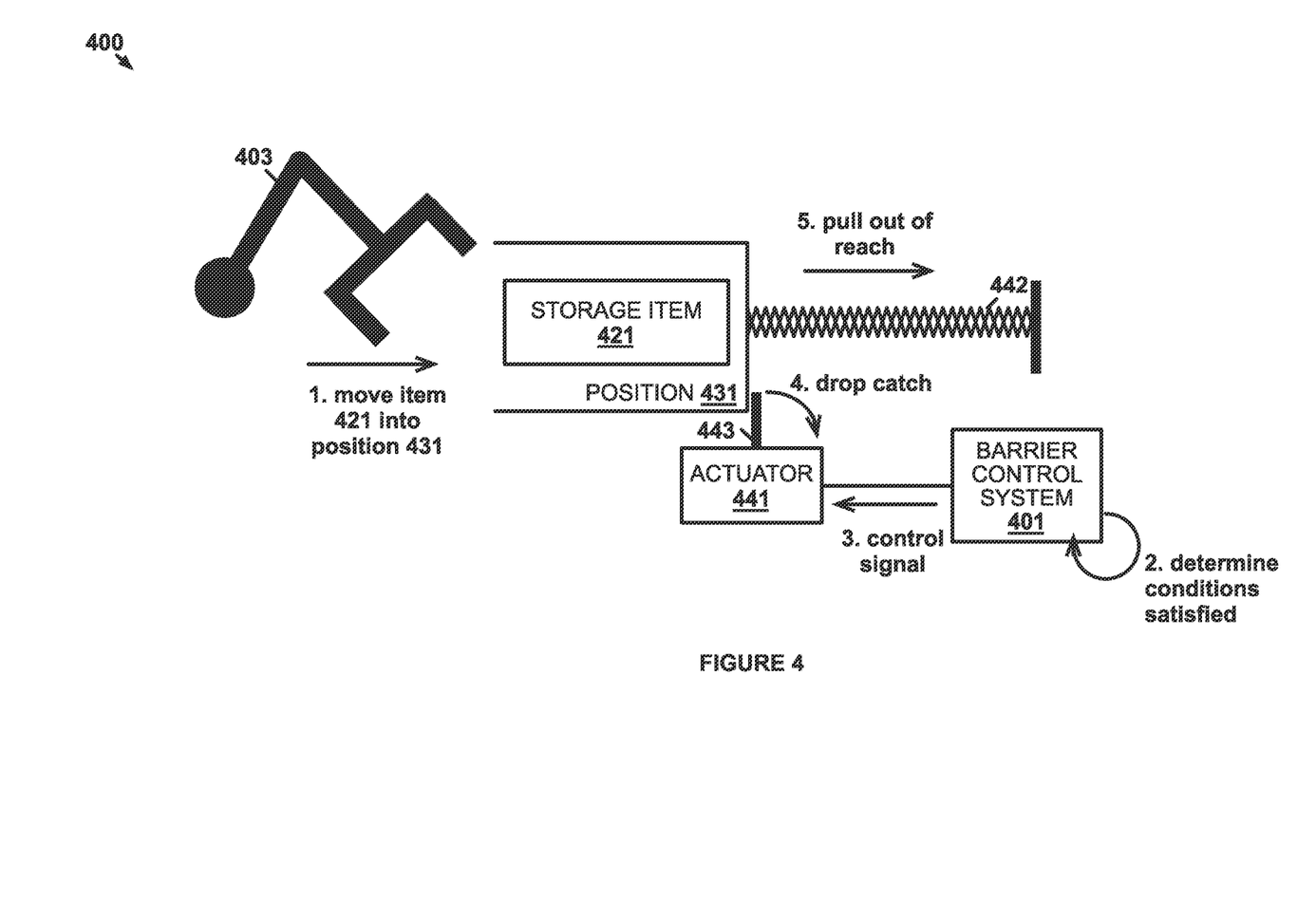
FIG. 4 illustrates an operational scenario for automatically implementing a physical barrier to prevent removable storage media access.

FIG. 4 illustrates operational scenario 400 for automatically implementing a physical barrier to prevent removable storage media access. Operational scenario 400 includes barrier control system 401, automatic transfer mechanism 403, storage item 421, storage position 431, actuator 441, catch 443, and spring 442. Barrier control system 401 is an example of barrier control system 101, automatic transfer mechanism 403 is an example of automatic transfer mechanism 103, storage item 421 is an example of storage item 121, and storage position 431 is an example of storage position 131. While shown separately, actuator 441, catch 443, and/or spring 442 may be considered part of barrier control system 401. There is no explicit example of physical barrier 102 in operational scenario 400 because the physical barrier created by barrier control system 401 in this scenario is an air gap between automatic transfer mechanism 403 and storage position 431.

Operational scenario 400 is similar to operational scenario 300 but, instead of using a motor and a screw to move a storage position, spring 442 is used to move storage position 431. Spring 442 is a coil spring affixed to storage position 431 at one end and to a static anchor point at the other. Storage position 431 is held in place by catch 443 to maintain a load on spring 442, which is stretched from its resting state to create a force on storage position 431 directed away from automatic transfer mechanism 403. Without catch 443 applying force in the opposite direction, spring 442 would retract to its resting state and move storage position 431 in the process. The force applied by spring 442 is enough to move storage position 431 (e.g., enough to overcome any friction created by a track on which storage position 431 moves) while, preferably, not enough to cause storage item 421 to fall out of storage position 431, or have some other adverse effect (e.g., for storage position 431 to go off-track, if applicable), when returning to its resting state.

In operational scenario 400, steps 1 and 2 occur similar to steps 1 and 2 or operational scenario 300. Automatic transfer mechanism 403 moves storage item 421 at step 1 into storage position 431 and then barrier control system 401 determines at step 2 that conditions for barrier implementation are satisfied. Upon determining that the conditions are satisfied, barrier control system 401 transfers a control signal at step 3 to actuator 441. Actuator 441 is a mechanism that controls the orientation of catch 443. Actuator 441 may include a motor, solenoid, spring, or other components that either hold catch 443 in the illustrated orientation an/or move catch 443 to another orientation. The control signal directs actuator 441 to drop, or otherwise move, catch 443 at step 4 out of an orientation that was preventing storage position 431 from being moved by spring 442. With catch 443 no longer counteracting the force being applied by spring 442, spring 442 pulls storage position 431 away from automatic transfer mechanism 403 at step 5. Upon completion of spring 442 pulling storage position 431, storage item 321, by virtue of being within storage position 431, is far enough away from automatic transfer mechanism 403 that automatic transfer mechanism 403 cannot grasp storage item 421 to remove storage item 421 from storage position 431.

In some examples, the control signal may be a supply of power (i.e., electricity) to actuator 441 that causes actuator 441 (e.g., a solenoid) to move catch 443 into an orientation that does not prevent storage position 431 from moving due to the force applied by spring 442. If catch 443 is configured to return to the previous position when power is no longer applied to actuator 441, then the power would be supplied at least for a duration necessary for storage position 431 to move enough such that catch 443 returning to position would not affect storage position 431 moving out of reach of automatic transfer mechanism 403. In some examples, actuator 441 may have its own power supply and processing/communication circuitry such that the control signal may be a instruction message transferred from barrier control system 401 over a wired and/or wireless link between actuator 441 and barrier control system 401. Upon receipt of the instruction message, the processing circuitry of actuator 441 directs actuator 441 to comply with the instruction message, which drops catch 443.

Figure 5:
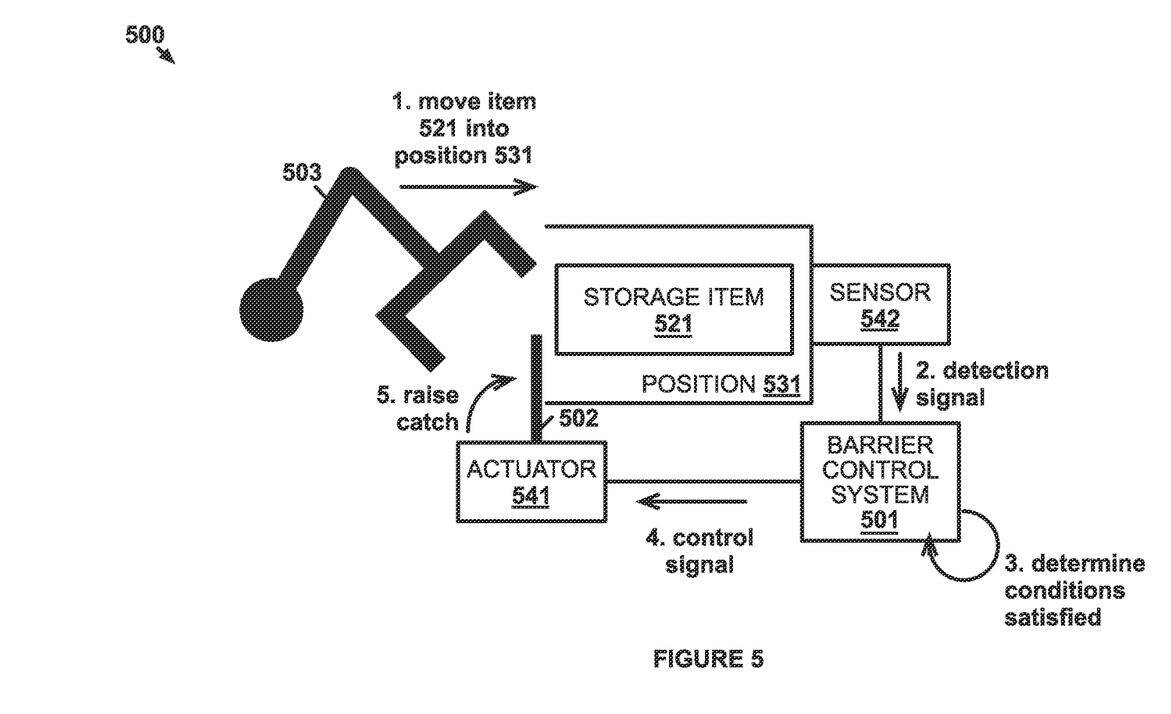
FIG. 5 illustrates an operational scenario for automatically implementing a physical barrier to prevent removable storage media access.

FIG. 5 illustrates operational scenario 500 for automatically implementing a physical barrier to prevent removable storage media access. Operational scenario 500 includes barrier control system 501, catch 502, automatic transfer mechanism 503, storage item 521, storage position 531, actuator 541, and sensor 542. Barrier control system 401 is an example of barrier control system 101, catch 502 is an example of physical barrier 102, automatic transfer mechanism 503 is an example of automatic transfer mechanism 103, storage item 521 is an example of storage item 121, and storage position 531 is an example of storage position 131. While shown separately, actuator 541, catch 502, and/or sensor 542 may be considered part of barrier control system 501.

In operational scenario 500, automatic transfer mechanism 503 moves storage item 521 at step 1 into storage position 531. Once storage item 521 is in storage position 531, sensor 542 detects that storage item 521 is in storage position 531. Sensor 542 may be a pressure sensor, occupancy sensor, or any other type of sensor capable of differentiating between an occupied storage position and an unoccupied storage position. In some examples, sensor 542 may be able to detect which particular storage item is positioned in storage position 531 (e.g., can determine that storage item 521, specifically, is located in storage position 531, as opposed to some other storage item). For instance, storage item 521 may have a barcode or RFID tag that sensor 542 is capable of reading.

Upon detecting that storage item 521 is in storage position 531, sensor 542 transfers a detection signal to barrier control system 501, which indicates to barrier control system 501 that storage item 521 is in storage position 531. In a simple example, storage item 521's presence in storage position 531 may affect an electrical signal (e.g., a line-voltage) on a link between sensor 542 an barrier control system 501 and barrier control system 501 recognizes the change in the electrical signal to indicate the detection of a storage item. In other examples, sensor 542 may include processing and communication circuitry necessary to transfer a detection message (i.e., detection signal) over a wired and/or wireless link with barrier control system 501.

After receiving the detection signal from sensor 542, barrier control system 501 determines at step 3 that conditions for implementing catch 502 (i.e., a physical barrier) have been satisfied. In one example, the mere receipt of the detection signal may satisfy a condition. In other examples, one or more other conditions may need to be satisfied for barrier control system 501 to trigger implementation of catch 502. Upon determining that the conditions are satisfied, barrier control system 501 transfers a control signal at step 4 to actuator 541. The control signal directs actuator 541 to raise, or otherwise move, catch 502 at step 5 into an position that prevents storage item 521 from being removed from storage position 531. For instance, actuator 541 may advance catch 502 out from within actuator 541 into the position shown or may swing catch 502 up from a position that is substantially perpendicular to the position shown. Prior to being raised, physical barrier 102 was in a position that allowed for automatic transfer mechanism 503 to insert storage item 521 into storage position 531 and remove storage item 521 from storage position 531. Catch 502 may prevent automatic transfer mechanism 503 from reaching and grasping storage item 521 or may prevent storage item 521 from being removed from storage position 531 even if automatic transfer mechanism 503 is able to grasp storage item 521. While shown as only partially covering the opening of storage position 531, catch 502 may cover more, if not all, of the opening in other examples (e.g., catch 502 may be a door type component of storage position 531).

In some examples, the control signal may be a supply of power (i.e., electricity) to actuator 541 that causes actuator 541 to move catch 502 into a position. In some examples, actuator 541 may have its own power supply and processing/communication circuitry such that the control signal may be an instruction message transferred from barrier control system 501 over a wired and/or wireless link between actuator 541 and barrier control system 501. Upon receipt of the instruction message, the processing circuitry of actuator 541 directs actuator 541 to comply with the instruction message, which raises catch 502.

It should be understood that the physical barriers implemented in operational scenarios 300-500, and the mechanisms (i.e., springs, motors, etc.) for implementing those barriers, are merely exemplary. Other manners of implementing a physical barrier to prevent removal of a storage item from a storage position may also be used. Similarly, more than one physical barrier may be implemented for a single storage position in some examples. For instance, both an air gap and a catch preventing storage item removal may be implemented.

Figure 6:
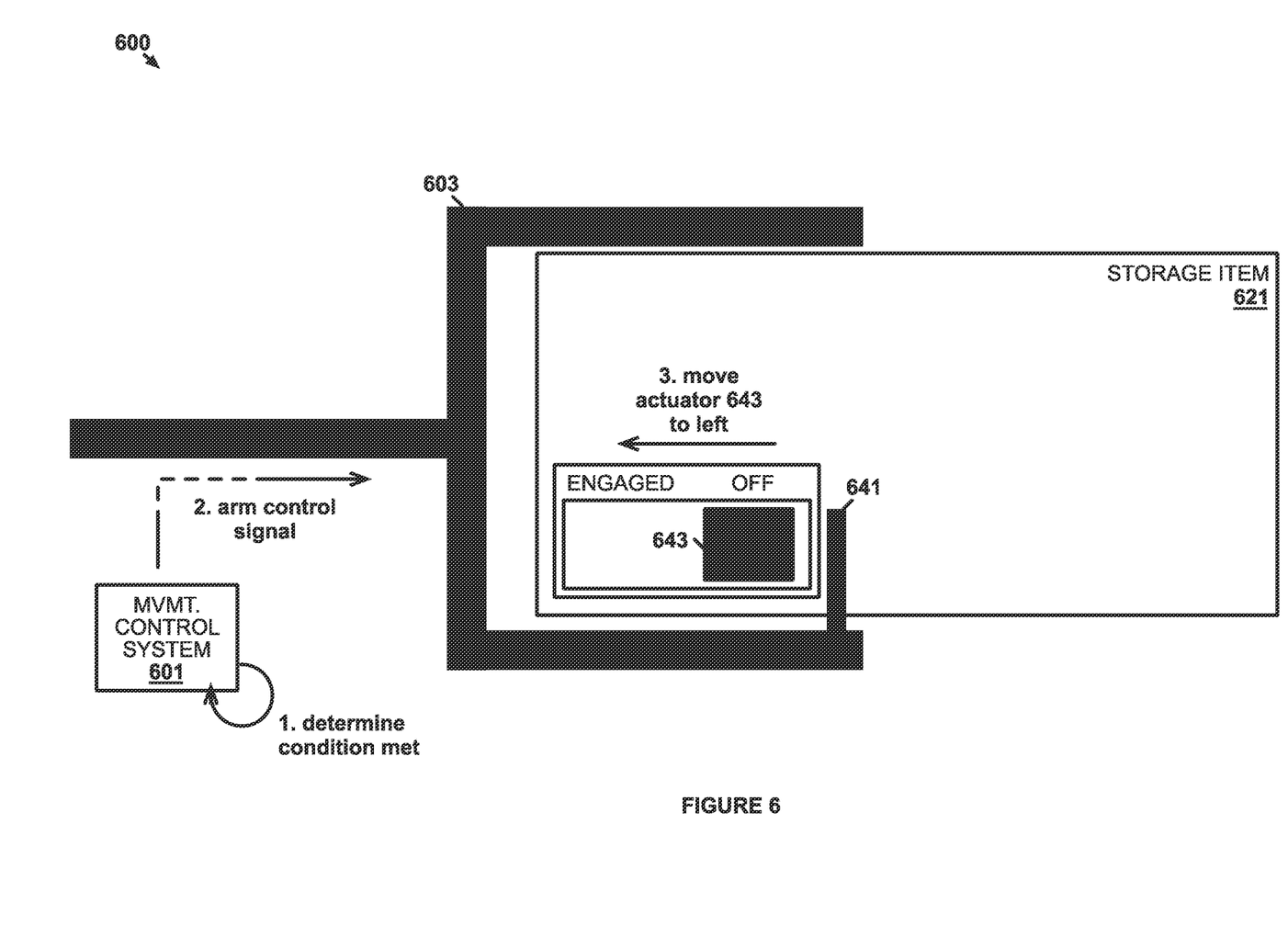
FIG. 6 illustrates an operational scenario for automatically implementing a physical barrier to prevent removable storage media access.

FIG. 6 illustrates operational scenario 600 for automatically implementing a physical barrier to prevent removable storage media access. Operational scenario 600 includes movement control system 601, automatic transfer mechanism 603, and storage item 621. Automatic transfer mechanism 603 is an example of automatic transfer mechanism 103 and storage item 621 is an example of storage item 121. Automatic transfer mechanism 603 includes switcher 641 and storage item 621 includes write-protection actuator 643. When in engaged position, write-protection actuator 643 indicates to an access device, into which storage item 621 may be placed, that write operations cannot be performed on storage item 621. The write operations may include writing new data, modifying data already stored, deleting data stored on storage item 621, or any other type of operation other than reading data from storage item 621. There are no such restrictions on access to storage item 621 when write-protection actuator 643 is in the off position.

In this example, switcher 641 is a component of automatic transfer mechanism 603 that is used to switch write-protection actuator 643 from the off position to the engaged position. Preferably, if movement control system 601 is compromised, switcher 641 is not able to switch write-protection actuator 643 from the engaged to the off position. For example, switcher 641 may not be shaped properly to catch write-protection actuator 643 when moving from engaged to off or write-protection actuator 643 may collapse (e.g., fold down into automatic transfer mechanism 603) when attempting to move write-protection actuator 643 from engaged to off. Switcher 641 is controlled by movement control system 601, which is a computing system that also controls the movement of automatic transfer mechanism 603. For example, a host system may request that storage item 621 be transferred from an access device to a storage position and movement control system 601 carries out that request by controlling automatic transfer mechanism 603 to move storage item 621. In other examples, switcher 641 may be controlled by some other system, such as a barrier control system. Likewise, in other examples, switcher 641 may be located elsewhere than automatic transfer mechanism 603, such as within a storage position.

In operational scenario 600, movement control system 601 determines at step 1 that conditions have been satisfied for engaging write-protection actuator 643. Like the conditions used by the barrier control systems above, the conditions used by movement control system 601 include one or more conditions that must be satisfied for movement control system 601 to trigger engagement of write-protection actuator 643. In some examples, the condition(s) used by movement control system 601 may be a subset of, or otherwise different than, the conditions used by a barrier control system to trigger implementation of a physical barrier. For example, a barrier control system may require that storage item 621 be located at a storage position and be at its data capacity before implementing a physical barrier. In contrast, movement control system 601 may only require that storage item 621 be at its data capacity, which allows movement control system 601 to trigger the engagement of write-protection actuator 643 prior to storage item 621 being placed in a storage position. Movement control system 601 may be able to determine, using its own sensors/information, whether the conditions are satisfied or may receive information regarding condition satisfaction from another system(s). For example, if a condition is that storage item 621 is being moved to one of a particular range of storage positions, then movement control system 601 may determine on its own that storage item 621 is being moved into one of those storage positions. However, movement control system 601 may need information from a host system if a condition requires storage item 621 to be at its data capacity (i.e., the host system would notify movement control system 601 that the condition is satisfied or otherwise provides movement control system 601 with information, such as capacity percentage, that movement control system 601 uses to determine that the condition is satisfied).

Upon determining that the conditions are satisfied, movement control system 601 uses an arm control signal at step 2 to direct automatic transfer mechanism 603 to engage write-protection actuator 643 using switcher 641. In response to the control signal, switcher 641 moves write-protection actuator 643 to the left at step 3, as shown, to engage write-protection on storage item 621. Automatic transfer mechanism 603 as a whole may move for switcher 641 to move write-protection actuator 643 to the left or switcher 641 may move independently of the rest of automatic transfer mechanism 603 to move write-protection actuator 643 to the left. In some examples, the control signal may first cause switcher 641 to position itself such that write-protection actuator 643 can be actuated (e.g., switcher 641 may be in a stored state, such as collapsed into automatic transfer mechanism 603 until directed by movement control system 601).

The automatic actuation of write-protection actuator 643 into the engaged position provides a level of protection for data on storage item 621 other than implementing the physical barrier in the above examples. As such, the automatic actuation of write-protection actuator 643 may be performed in addition to physical barriers or as an alternative thereto. In one example, engaging write-protection actuator 643 provides data protection until conditions are satisfied to trigger implementation of a physical barrier.

It should be understood that operational scenario 600 is merely an example of how automatic actuation of write-protection actuator 643 may be performed. The actual form taken by write-protection actuator 643 in practice will dictate the form taken by switcher 641 to actuate write-protection actuator 643. For example, write-protection actuator 643 may be sunk into an opening of storage item 621, which would require that switcher 641 be shaped to fit into that opening.

Figure 7:
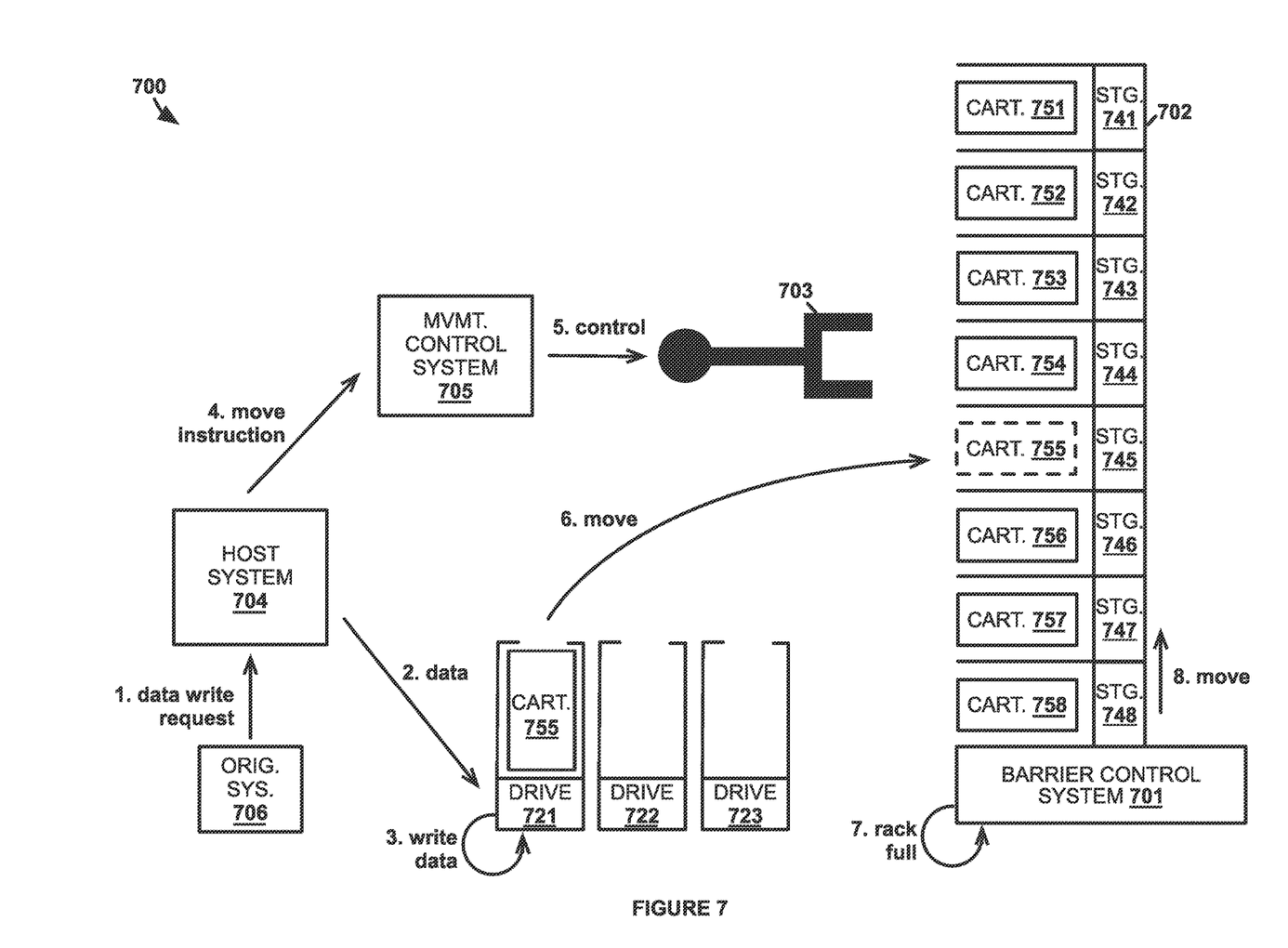
FIG. 7 illustrates an operational scenario for automatically implementing a physical barrier to prevent removable storage media access.

FIG. 7 illustrates operational scenario 700 for automatically implementing a physical barrier to prevent removable storage media access. In particular, operational scenario 700 is an example of how the teachings above may be incorporated into the operation of a robotic tape library. Operational scenario 700 includes barrier control system 701, storage magazine 702, automatic transfer mechanism 703, host system 704, movement control system 705, origination system 706, and tape drives 721-723. Storage magazine 702 includes storage positions 741-748 that can each store a respective tape cartridge. Tape cartridges 751-758 contain magnetic tape for storing data and are each an example of the removable storage media items, such as storage item 121, discussed in the other examples herein.

Though not shown, it should be understood that communications between elements in operational scenario 700, as described below, occur over wired and/or wireless communication links. In some cases, the communication links are part of a communication network, which may include one or more local area networks, wide area networks, the Internet, or some other type of network. In this example, barrier control system 701 is not communicatively connected to any other system (e.g., not connected to a communication network) to prevent barrier control system 701 from being compromised by an external system. In other examples, barrier control system 701 may be connected to one or more other systems, such as host system 704, at least in a capacity to receive information used to determine whether a condition is satisfied.

In operational scenario 700, origination system 706 transfers a data write request at step 1 to host system 704. Origination system 706 may be a user workstation, a data server, or any other type of computing system that may have a reason to store data on a magnetic tape. For example, the data may be a backup of data stored on origination system 706. Host system 704 determines that tape cartridge 755 should be used to store the data and, since tape cartridge 755 is already located in tape drive 721, host system 704 transfers the data at step 2 to tape drive 721. Upon receiving the data, tape drive 721 writes the data at step 3 to the magnetic tape within tape cartridge 755. When tape drive 721 has completed the write operation, host system 704 determines that tape cartridge 755 should be moved to a storage position and transfers a move instruction at step 4 to movement control system 705. Host system 704 may determine that tape cartridge 755 should be stored because tape cartridge 755 has reached its data capacity, because tape drive 721 needs to be used to access another tape cartridge, or for some other reason.

In response to the move instruction, movement control system 705 controls automatic transfer mechanism 703 at step 5 to perform a move of tape cartridge 755. Accordingly, automatic transfer mechanism 703 moves tape cartridge 755 at step 6 from tape drive 721 to storage position 745. Using sensors in storage magazine 702, barrier control system 701 determines at step 7 that, upon placement of tape cartridge 755 in storage position 745, storage magazine 702 is now full (i.e., all of storage positions 741-748 have a tape cartridge stored therein). In this example, storage magazine 702 being full is the condition that must be met for barrier control system 701 to trigger implementation of a physical barrier between storage positions 741-748 and automatic transfer mechanism 703. Thus, in response to storage magazine 702 being full, barrier control system 701 moves storage magazine 702 as a whole by shifting storage magazine 702 sideways from its original position. The distance of the shift is far enough to prevent automatic transfer mechanism 703 from aligning itself with any of tape cartridges 751-758 in a manner that would allow automatic transfer mechanism 703 to grasp one of tape cartridges 751-758, which effectively creates an air gap between automatic transfer mechanism 703 and tape cartridges 751-758. In some cases, that distance may only be fractions of an inch. If automatic transfer mechanism 703 attempts to grasp one of tape cartridges 751-758, automatic transfer mechanism 703 will not align with a grasp position on the tape cartridge and may instead bump against neighboring tape cartridges or storage magazine 702. As such, if origination system 706, host system 704, or movement control system 705 is compromised, there is no way for any of those systems to access data stored on any of tape cartridges 751-758.

Preferably, should any of tape cartridges 751-758 need to be accessed after the air gap has been created, barrier control system 701 is not connected to any system that can be compromised and remotely trigger barrier control system 701 to remove the air gap. In those cases, barrier control system 701 may only have a local user interface that requires a local user to trigger barrier control system 701's movement of storage magazine 702 back to a position accessible by automatic transfer mechanism 703. In some further examples, a human user may need to manually push storage magazine 702 back into a position accessible by automatic transfer mechanism 703.

Figure 8:
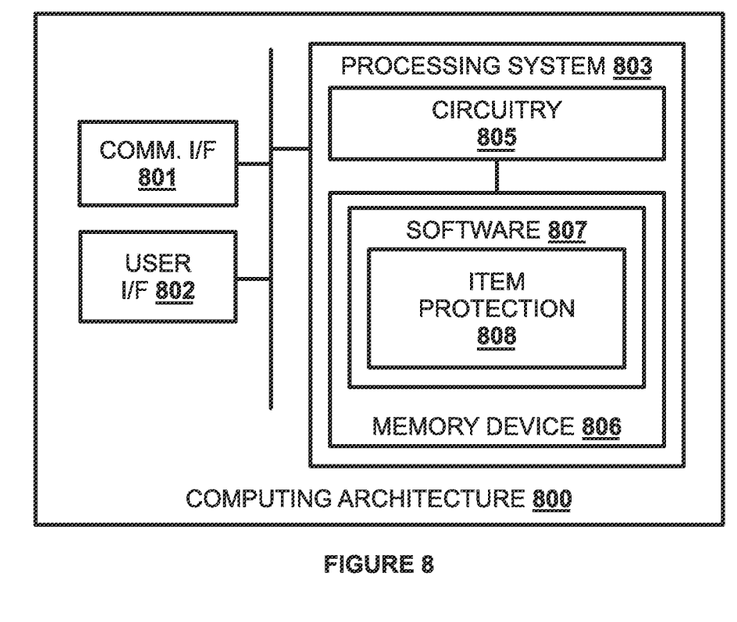
FIG. 8 illustrates a computing architecture for automatically implementing a physical barrier to prevent removable storage media access.

FIG. 8 illustrates computing architecture 800 for automatically implementing a physical barrier to prevent removable storage media access. Computing architecture 800 is an example computing architecture for barrier control system 101, although system 101 may use alternative configurations. A similar architecture may also be used for other systems described herein (e.g., arm control system 705, host system 704, etc.), although alternative configurations may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes storage item protection module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, storage item protection module 808 directs processing system 803 to determine that an item of removable storage media moved into a storage position using an automatic transfer mechanism and determining that a condition for protecting the item is satisfied. Upon determining that the condition is satisfied, storage item protection module 808 directs processing system 803 to implement a physical barrier that prevents the automatic transfer mechanism from removing the item from the storage position.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for protecting data on a storage item within an automated storage library, the method comprising the steps of:

determining with a barrier control system that the storage item is located within a storage position, wherein the storage item has been placed in the storage position by an automatic transfer mechanism, the barrier control system including processing circuitry;

determining with the barrier control system that a condition for protecting the storage item is satisfied; and upon determining that the condition for protecting the storage item is satisfied, implementing a physical barrier with the barrier control system such that the automatic transfer mechanism is unable to remove the storage item from the storage position, the physical barrier being implemented while the storage item is located within the storage position;

wherein prior to the physical barrier being implemented, the automatic transfer mechanism is capable of removing the storage item from the storage position.

2. The method of claim 1 further comprising the step of moving the storage item into the storage position with the automatic transfer mechanism prior to determining with the barrier control system that the storage item is located within the storage position.

3. The method of claim 1 wherein once the physical barrier is implemented, the automatic transfer mechanism is not capable of removing the physical barrier.

4. The method of claim 1 wherein after the step of implementing the physical barrier, only movement triggered by a human user collocated with the physical barrier can remove the physical barrier.

5. The method of claim 4 wherein after removal of the physical barrier, the automatic transfer mechanism is again capable of removing the storage item from the storage position.

6. The method of claim 1 wherein the step of implementing the physical barrier includes creating a physical air gap between the storage item and a reach of the automatic transfer mechanism.

7. The method of claim 6 wherein the step of creating the physical air gap includes moving the storage position with the storage item being located therein relative to the reach of the automatic transfer mechanism.

8. The method of claim 1 wherein the step of implementing the physical barrier includes positioning a component relative to the storage item to physically block the automatic transfer mechanism from removing the storage item from the storage position.

9. The method of claim 1 wherein the condition for protecting the storage item includes one of reaching data capacity and meeting a protection threshold.

10. The method of claim 1 wherein the storage item includes one of a magnetic tape, an optical disk, a magnetic disk and flash memory.

11. An apparatus for protecting data on a storage item within an automated storage library, the apparatus comprising:
    a barrier control system including processing circuitry that is operatively coupled with the storage item; and
    program instructions stored within the automated storage library that, when read and executed by the barrier control system, direct the barrier control system to:
        determine that the storage item is located within a storage position, wherein the storage item has been placed in the storage position by an automatic transfer mechanism;
        determine that a condition for protecting the storage item is satisfied; and
        upon determining that the condition for protecting the storage item is satisfied, implement a physical barrier such that the automatic transfer mechanism is unable to remove the storage item from the storage position, the physical barrier being implemented while the storage item is located within the storage position;
    wherein prior to the physical barrier being implemented, the automatic transfer mechanism is capable of removing the storage item from the storage position.

12. The apparatus of claim 11 wherein the automatic transfer mechanism moves the storage item into the storage position prior to the barrier control system determining that the storage item is located within the storage position.

13. The apparatus of claim 11 wherein once the physical barrier is implemented, the automatic transfer mechanism is not capable of removing the physical barrier.

14. The apparatus of claim 11 wherein after the physical barrier is implemented, only movement triggered by a human user collocated with the physical barrier can remove the physical barrier.

15. The apparatus of claim 14 wherein after removal of the physical barrier, the automatic transfer mechanism is again capable of removing the storage item from the storage position.

16. The apparatus of claim 11 wherein the barrier control system being directed to implement the physical barrier includes the barrier control system being directed to create a physical air gap between the storage item and a reach of the automatic transfer mechanism.

17. The apparatus of claim 16 wherein the barrier control system being directed to create the physical air gap includes the barrier control system being directed to move the storage position with the storage item being located therein relative to the reach of the automatic transfer mechanism.

18. The apparatus of claim 11 wherein the barrier control system being directed to implement the physical barrier includes the barrier control system being directed to position a component relative to the storage item to physically block the automatic transfer mechanism from removing the storage item from the storage position.

19. The apparatus of claim 11 wherein the condition for protecting the storage item includes one of reaching data capacity and meeting a protection threshold.

20. The apparatus of claim 11 wherein the storage item includes one of a magnetic tape, an optical disk, a magnetic disk and flash memory.

* * * * *